United States Patent [19]

Soulliard et al.

[11] Patent Number: 4,471,352

[45] Date of Patent: Sep. 11, 1984

[54] PROGRAMMABLE PAGING ENCODER

[75] Inventors: Charles J. Soulliard; Herschel W. Ward, both of Tucson, Ariz.

[73] Assignee: Midian Electronics, Inc., Tucson, Ariz.

[21] Appl. No.: 250,062

[22] Filed: Apr. 1, 1981

[51] Int. Cl.[3] .......................... G08B 5/22; H04B 7/24

[52] U.S. Cl. .......................... 340/825.44; 340/825.48; 179/2 EC; 364/900

[58] Field of Search ......... 340/825.44, 825.45-825.48, 340/825.69, 825.72, 345; 364/200, 900, 707; 179/2 EC, 90 B, 18 BF; 455/38

[56] References Cited

U.S. PATENT DOCUMENTS

| | | | |
|---|---|---|---|
| 3,134,961 | 5/1964 | Clark . | |
| 3,335,406 | 8/1967 | Clark . | |
| 3,510,864 | 5/1970 | McDonald . | |
| 3,731,200 | 5/1973 | Schwendemann et al. . | |
| 4,021,608 | 5/1977 | Brodeur | 340/825.44 |
| 4,145,655 | 3/1979 | Caudel et al. | 455/38 |
| 4,147,984 | 4/1979 | Caudel et al. | 455/38 |
| 4,165,504 | 8/1979 | Remedi . | |
| 4,167,655 | 9/1979 | Hestad et al. . | |
| 4,168,399 | 9/1979 | D'Amico et al. . | |
| 4,178,475 | 12/1979 | Taylor et al. | 179/2 EC |
| 4,259,594 | 3/1981 | Fox et al. | 364/707 |
| 4,278,845 | 7/1981 | Chiou | 179/90 B |

*Primary Examiner*—James J. Groody
*Attorney, Agent, or Firm*—Harold A. Gell, Jr.

[57] ABSTRACT

A paging encoder including a microcomputer having a look-up table containing code formats for the more popular paging systems and an energy conservation means whereby the microcomputer is maintained in an off state except when called upon to perform an encoding function by a keyboard input means. This is accomplished by a microcomputer programmed to contain a lookup table including tone and space data for a plurality of paging formats and routines for converting input data, such as a telephone number, to a tone and space code for a selected one of said paging formats as programmed by a selection means which alters the function of the microcomputer to cause it to provide the desired output tone and space codes in accordance with the selected paging format.

13 Claims, 1 Drawing Figure

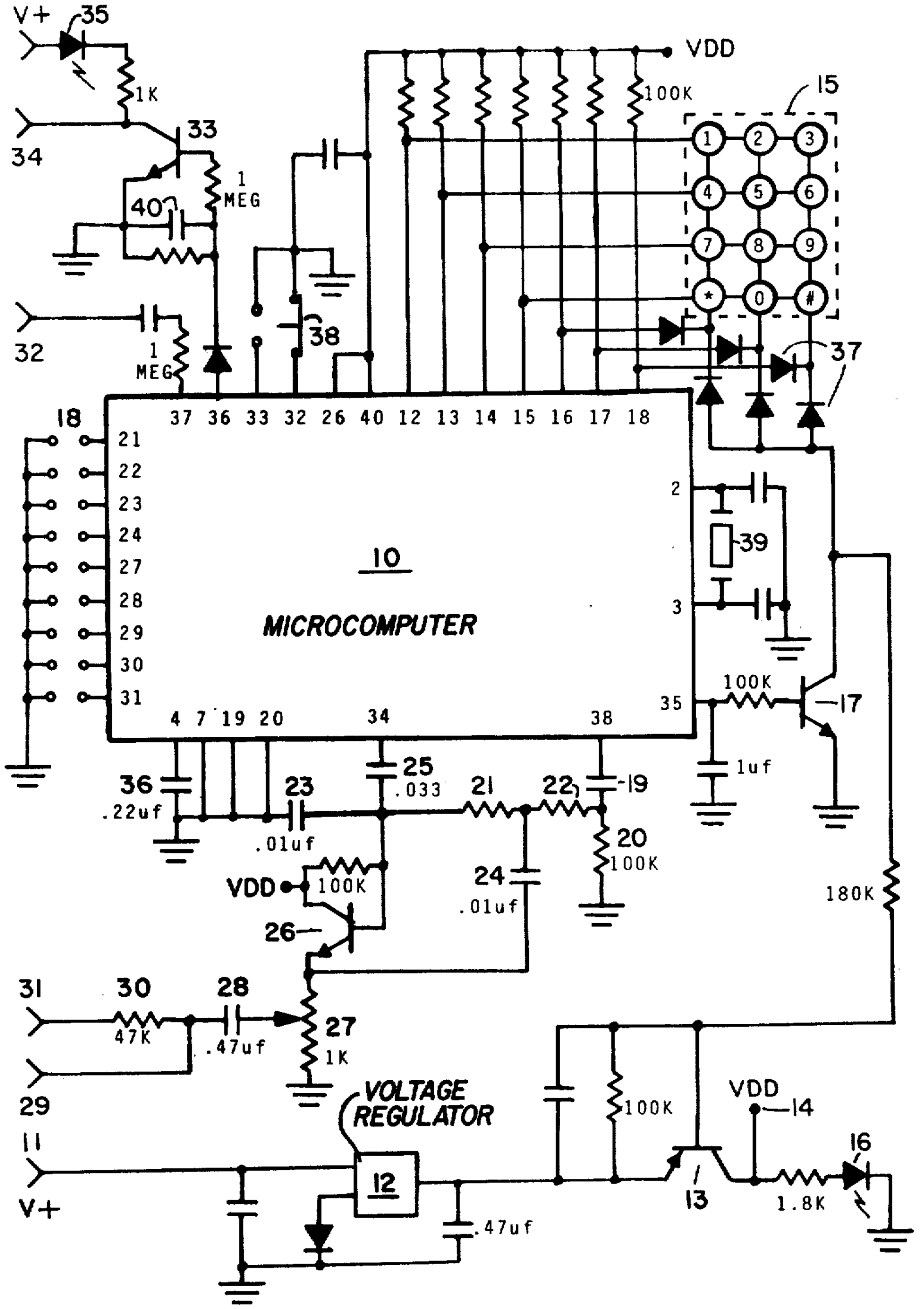
V+
35
1K
34
33
1 MEG
40
32
1 MEG
38
VDD
100K
15
18
37 36 33 32 26 40 12 13 14 15 16 17 18
21
22
23
24
27
28
29
30
31
10
MICROCOMPUTER
2
39
3
37
35
100K
17
1uf
4 7 19 20
34
38
36
.22uf
23
.01uf
25
.033
21
22
19
20
100K
24
.01uf
VDD
100K
26
31
30
47K
28
.47uf
27
1K
29
VOLTAGE
REGULATOR
11
V+
12
100K
VDD
14
13
1.8K
16
.47uf
180K

PROGRAMMABLE PAGING ENCODER

TECHNICAL FIELD

This invention relates to a paging encoder which utilizes a microcomputer to produce two-tone sequential or five-tone codes which are transmitted via an associated transmitter to portable telephone paging receivers.

BACKGROUND OF PRIOR ART

Traditionally, paging encoders have been bulky, expensive, desk bound units suffering from limited capacity and a lack of adaptability which would allow operation across the spectrum of different selective signalling formats.

Incompatibility between signalling formats of the various paging systems creates a severe handicap on prior art systems because numerous formats are currently employed. The most popular are: the Motorola two-tone, Motorola five-tone, Motorola six-tone, General Electric two-tone (Type 99), and Reach two-tone signalling formats.

Attempts have been made to provide paging encoders which are capable of operating within the requirements of the various signalling formats, but such systems have been expensive to design and fabricate due to the numerous differences between the various formats.

For example, Motorola utilizes one second for the first tone, two to three seconds for the second tone, and requires seven to eight seconds for group calls. The system employs six reed groups of ten tones each, which permit about 870 codes in the basic tone pairing scheme and approximately 3,500 tone pairs in an extended assignment plan.

General Electric employs a 1-second first tone and a 1.5-second second tone, and does not allow for any group call. Instead it provides an extra tone, known as the diagonal tone, to replace the first tone of any identical tone pair. This occurs in pager codes employing a 0, 2, or 4 as the first number of the cap code. Incorporated in their code plan are three reed groups of ten tones each plus one diagonal tone that allows them to generate 900 different codes.

The Reach system features both fast and slow two-tone sequences. They have a wider frequency spread between their tones to facilitate high-speed encoding. Their high-speed tone timings are running about 100–150 milliseconds for both tones. The slower format employs a 2-second first tone and a 700-millisecond second tone. This slower scheme works in conjunction with their battery-saving feature to permit up to a year's operation between battery changes. Reach uses a single tone of 5 seconds duration to initiate group call. The Reach format incorporates a total of 60 tones. However, only tones 11–55 are used for two-tone selective calling and that permits 1000 codes.

Motorola uses a totally different strategy in its five- and six-tone decimal digital pager. Rather than selecting two tones from a large range of frequencies to generate all of the tones needed in a high capacity system, Motorola elected to use a new technique that allows the pagers to generate from 100,000 to 1,000,000 codes using only 12 tones. The straight five-tone address will produce 100,000 calls while adding 10 different preambles ahead of each address would accommodate 1,000,000 codes. This 1,000,000 code capacity would apply only to pagers with the battery-saving option that relies on the correct preamble to wake it up.

The basic signalling scheme used in the five-tone sequence consists of an optional 690 millisecond preamble tone followed by a 45-millisecond gap of unmodulated carrier, then five sequential tones each of 33 milliseconds in length and either a 52-millisecond gap (five-tone) or 52 milliseconds of special tone X (six-tone).

The X tone is used to activate the uninterrupted tone in the dual-address pagers instead of the normal pulsating tone that results from a five-tone address. Twelve frequencies are used to represent the digits 0–9, repeat tone R, and special tone X. The repeat tone is substituted each time there are two identical, successive digits appearing in the address code. For example, an address code of 25597 would be converted to 25R97. The preamble can be set to any one of the 10 tones 0–9, or can duplicate the first number in the address code.

In addition to all the different format problems, it is difficult to make any code assignment changes within the same format. For example, in the Motorola expanded code assignment plan, there are over 20 different cap code prefixes producing 180 group combinations (Motorola Pager Manual Table 3). Most encoders are capable of handling only one of the 20 combinations at a time, if that many. In earlier units, it was necessary to change reed banks in order to change from one code assignment to another.

OBJECTIVES OF THE INVENTION

In view of the preceding, it is a primary objective of the present invention to provide a paging encoder capable of easily changing formats, code assignment plans and preambles.

A further object of the present invention is to provide a paging encoder capable of easily changing formats, code assignments and preambles which is small and inexpensive and highly stable and reliable.

A still further objective of the present invention is to provide a paging encoder as suggested above which is capable of operating from a battery power source having a wide voltage range.

Another objective of the present invention is to provide a miniaturized paging encoder that can be used in combination with a portable transmitter such as a walkie-talkie or a mobile unit.

A still further objective of the present invention is to provide a paging encoder having wide format capabilities adaptable to function in any of the standard encoding systems.

Another objective of the present invention is to provide a paging encoder adaptable for combining with a signal generator to provide a testing system for paging receivers.

Another objective of the present invention is to incorporate microcomputer technology to create a miniaturized paging encoder capable of easily changing formats, code assignment plans, and preambles.

Another objective of the present invention is to provide a paging encoder utilizing microcomputer technology in combination with energy conservation means adapted to keep the microprocessor and associated electronics in an off state except during periods when encoding operations are being performed.

A still further objective of the present invention is to provide a microcomputer controlled paging encoder capable of providing encoding compatible with any of the below listed systems in response to positioning of a simple switch or jumper cable system:

Motorola Two-Tone Basic 870 Call
Motorola Two-Tone Expanded Code Plan
Tororola Five-Tone (No Preamble)
Motorola Five-Tone With X Tone and No Preamble
Motorola Five-Tone With Preamble
Motorola Five-Tone With X Tone and Preamble
Reach (High Speed)
Reach (Low Speed)
General Electric (Type 99)

The preceding, and other objectives of the present invention will become apparent in light of the specification, drawings and claims which follow.

BRIEF SUMMARY OF THE INVENTION

The paging encoder disclosed herein employs a microcomputer to generate all the tones and timing requirements required by any of the paging encoding schemes in use.

The microcomputer of the paging encoder is programmed with a look-up table containing all of the code formats, while specific system formats are selected by either a series of jumper interconnections or a multiple contact switching arrangement. A keypad code entry automatically turns on the microcomputer and enters the desired code into the computer system which then converts it to the proper format and delivers it to an output means coupled to a compatible transmitter.

In addition to providing a properly encoded output signal, the microprocessor provides a lock-on function that maintains power to the system during the encoding function and disconnects the system from the power source at the completion of the encoding operation to conserve the power source.

Additional features of the system provided by the microprocessor are annunciating side tones for audible feedback and a push-to-talk enable function, both of which function in conjunction with the associated receiver transmitter. The push-to-talk enable function activates the transmitter and maintains the transmitter in an on-state for a period of time long enough to allow the generated code to be transmitted plus a brief additional period during which time an operator may add a verbal message.

BRIEF DESCRIPTION OF THE DRAWINGS

The single drawing of this patent is a schematic representation of a preferred embodiment of the subject paging encoder illustrating the inputs, outputs, and supporting functions of the microprocessor.

DETAILED DESCRIPTION OF THE INVENTION

Any of the large variety of microcomputers may be adapted to function in the present invention. However, for explanatory purposes a typical circuit describing the invention is presented hereby which utilizes a single chip microcomputer of the 8048 series. The integrated computer circuit and its associated operational and controlling circuits is illustrated in the FIGURE. The program required to adapt the microcomputer to perform the required functions is presented at a later point in this specification.

In its quiescent state, the paging encoder illustrated in the FIGURE is off. A voltage source in the range of 7 to 8 volts is applied at input pin 11 and coupled to a voltage regulator 12 which produces a regulated 5.6 volt output. Transistor Q13 which in the exemplary system is a type MPSA65, is normally off and the voltage distribution point VDD 14 for the system is at 0 volts. When one of the keys on keypad 15 is depressed, it provides a ground connection to the base of transistor 13 and this turns on the transistor and couples the 5 volt regulated power source 12 to the power distribution point VDD 14.

The keypad 15 may be any of a large number of available keypads such as the 12 button Digitran or Chomerics. In the preferred embodiment disclosed, a Digitran type keypad incorporating three light emitting diodes colored Red, Green, and Yellow is used. However, any keypad capable of being coupled to a system to provide a ground upon key activation may be utilized.

When transistor 13 is energized and a positive 5 volts is available at the voltage distribution point 14, the Red LED indicator 16 is energized to signify that the system is on and the microcomputer 10 is energized via input pin 40. Once energized, the microcomputer 10 provides a positive voltage level at pin 35 for a predetermined period of time. This positive voltage is applied to the base of transistor 17 and turns that PN2222 transistor on which, in turn, maintains transistor 13 in the conducting state to lock-on the power distribution circuit to keep the microcomputer 10 energized. A delay means is included in the microcomputer system which terminates the positive voltage at pin 35 after a predetermined delay period calculated to enable completion of the encoding processes after activation of the last digit via keyboard 15. Optional capacitor 40 provides a time delay which continues to allow activation of the transmitter via transistor 33 after removal of the output on pin 36 for a period of time which will enable an operator to transmit an additional message after the encoded signal. After the time delay, with the positive voltage level on pin 35 of microcomputer 10 removed, transistor 17 turns off, and transistor 13 turns off disconnecting the positive VDD voltage from the microcomputer and associated circuitry until such time that a key on keypad 15 is again activated.

In addition to turning on the power distribution system, keypad 15 provides a means to selectively apply ground potential to pins 12 through 18 of the microcomputer. When the computer is energized, these pins are normally at a positive potential due to their connection to a resistive network comprised of 100 K resistors to the regulated 5 volt distribution network. A ground input on pins 12 through 18 of the microcomputer 10 is interpreted by the microcomputer as a 2 out of 7 code forming one of the digits identifying a paging receiver to be alerted. When the complete paging receiver identifier has been entered into the microcomputer 10 via keypad 15 and input pins 12 through 18, a properly encoded pulse train comprised of square waves is applied to output pin 38 of the microcomputer 10. The type of encoding performed by microcomputer 10 is a function of selector switch 18 which selectively grounds pins 21 through 24 and 27 through 31 of microcomputer 10. In an alternate embodiment, the switch system may be replaced by jumper wires, but in either case selected pins are coupled to ground to cause the microprocessor to encode in accordance with a desired system format. Listed in the table below are the jumper connections or switch positions required by the exemplary system presented herein to enable the paging encoder to produce the indicated system formats. In the chart, a 0 indicates that the indicated pin of microcomputer 10 is open and a 1 indicates the pin is connected to ground.

| | PIN | | | |
|---|---|---|---|---|
| | 24 | 23 | 22 | 21 |
| Motorola Two-Tone Basic 870 Call and Expanded Code Plan with Group Call | 0 | 0 | 0 | 0 |
| Motorola Five-Tone (No Preamble) | 0 | 0 | 1 | 0 |
| Motorola Five-Tone with X Tone and No Preamble | 0 | 0 | 1 | 1 |
| Motorola Five-Tone with Preamble | 0 | 1 | 0 | 0 |
| Motorola Five-Tone with X Tone and Preamble | 0 | 1 | 0 | 1 |
| Reach (High Speed) | 0 | 1 | 1 | 0 |
| Reach (Low Speed) | 0 | 1 | 1 | 1 |
| General Electric (Type 99) | 1 | 0 | 0 | 0 |

When the system is functioning in any one of the Motorola five-tone formats, depressing the * on the keypad will cause the system to select an X tone regardless of the condition of pin 21 of the microcomputer.

When microcomputer pins 21, 22, 23 or 24 have been connected to select a Motorola code assignment, the below listed chart indicates the ground or open status that should be maintained on microcomputer pins 27 through 31 to select the 20 Motorola prefixes.

| | PIN | | | | | |
|---|---|---|---|---|---|---|
| | 31 | 30 | 29 | 38 | 27 | Prefix |
| Motorola Two-Tone | 0 | 0 | 0 | 0 | 0 | Standard 870 call |
| Motorola Two-Tone | 0 | 0 | 0 | 0 | 1 | B |
| | 0 | 0 | 0 | 1 | 0 | C |
| | 0 | 0 | 0 | 1 | 1 | D |
| | 0 | 0 | 1 | 0 | 0 | E |
| | 0 | 0 | 1 | 0 | 1 | F |
| | 0 | 0 | 1 | 1 | 0 | G |
| | 0 | 0 | 1 | 1 | 1 | H |
| | 0 | 1 | 0 | 0 | 0 | J |
| | 0 | 1 | 0 | 0 | 1 | K |
| | 0 | 1 | 0 | 1 | 0 | L |
| | 0 | 1 | 0 | 1 | 1 | M |
| | 0 | 1 | 1 | 0 | 0 | N |
| | 0 | 1 | 1 | 0 | 1 | P |
| | 0 | 1 | 1 | 1 | 0 | Q |
| | 0 | 1 | 1 | 1 | 1 | R |
| | 1 | 0 | 0 | 0 | 0 | S |
| | 1 | 0 | 0 | 0 | 1 | T |
| | 1 | 0 | 0 | 1 | 0 | U |
| | 1 | 0 | 0 | 1 | 1 | V |
| | 1 | 0 | 1 | 0 | 0 | W |

When microcomputer 10 pins 21, 22, 23 or 24 have been connected to select a Motorola five-tone format, the following chart indicates the connection of microcomputer pins 27 through 31 for selection of different preambles.

| | PIN | | | | | |
|---|---|---|---|---|---|---|
| | 31 | 30 | 29 | 28 | 27 | Preamble |
| Motorola Five-Tone | 0 | 0 | 0 | 0 | 0 | Same as 1st tone |
| | 0 | 0 | 0 | 0 | 1 | Tone 1 |
| | 0 | 0 | 0 | 1 | 0 | Tone 2 |
| | 0 | 0 | 0 | 1 | 1 | Tone 3 |
| | 0 | 0 | 1 | 0 | 0 | Tone 4 |
| | 0 | 0 | 1 | 0 | 1 | Tone 5 |
| | 0 | 0 | 1 | 1 | 0 | Tone 6 |
| | 0 | 0 | 1 | 1 | 1 | Tone 7 |
| | 0 | 1 | 0 | 0 | 0 | Tone 8 |
| | 0 | 1 | 0 | 0 | 1 | Tone 9 |

-continued

| PIN | | | | | |
|---|---|---|---|---|---|
| 31 | 30 | 29 | 28 | 27 | Preamble |
| 0 | 1 | 0 | 1 | 0 | Tone 0 |

In accordance with the setting of switch 18 or the substitute jumpers therefore and the digits keyed in on keypad 15, computer 10 outputs on pin 38 the appropriate tones as square waves which are processed by the differentiator comprised of C19 and R20. This differentiator accentuates the highs in the output signal to compensate for their attenuation in the following low pass filter comprised of R21 and 22 and C23 and 24. This filter produces a triangular wave which is a pseudo sine wave. An additional capacitor, capacitor 25 is coupled to ground in parallel with capacitor 23 by computer 10 when the output is below 900 Hz to increase the roll off on the low frequencies. This provides better filtering at the low frequencies and stabilizes the output by compensating for the increased filtering of the higher frequencies. This eliminates most of the third harmonic distortion and the resultant sine wave controls condition of output transistor 26. In the illustrated embodiment, this transistor is a type PN2222 and the emitter is coupled to ground via a 1 kilohm potentiometer 27 with the output taken off of the variable potentiometer tap. This output is applied through a capacitor 28 to the low impedance output 29 and through resistor 30 to high impedance output 31.

Whenever a key on the keypad 15 is depressed, the computer 10 provides a chirp tone output at pin 37 to output jack 32 which may be connected to an annunciator such as the speaker of the receiver transmitter to which the encoder is coupled. This feature is to provide an audio indication of key actuation.

When the computer 10 has received the input from the keypad and prior to its commencing to output the resultant encoded data, pin 36 does high and causes transistor 33 to become conductive. This energizes the push-to-talk switch or relays in the associated transmitter via jack 34 and also provides a path for current flow through light emitting diode 35. In a preferred embodiment, this diode is the Green diode on the keypad and it indicates that an encoded signal is being transmitted.

The output or high level at pin 36 occurs approximately one-half a second before the encoded tones are provided at pin 38 of computer 10 and it lasts until power is disconnected from the computer as a function of removal of the high voltage level at pin 35 as previously discussed.

Capacitor 36 provides a delay function which prevents the computer 10 from becoming activated upon the application of the regulated 5 volts until the capacitor charges. There's an internal resistor within the computer that creates a voltage drop that causes this capacitor to require approximately 20 milliseconds before it enables the computer to power up.

Diodes are incorporated in the circuit to provide isolation for the power control circuit to ensure that the power control circuit will not affect the operation of the codes entered into the computer and to further ensure that operations within the computer will not adversely affect the operation of the power control system.

Normally closed push-button switch 38 grounds pin 32 of the microcomputer 10. When pin 32 is grounded, the push-to-talk function at pin 36 is withheld by the microcomputer 10. Depressing switch 38 removes the ground connection from pin 32 and allows the push-to-talk enabling signal to be applied to the transmitter and the encoded paging signal to be presented on output pin 38.

Grounding pin 33 of microcomputer 10 causes a 250 millisecond gap to occur between the first and second tones in the Motorola and General Electric two-tone formats.

Timing within the microcomputer 10 is controlled by a 3.58 MC crystal 39 connected across pins 2 and 3.

In the exemplary system presented herein, the microcomputer 10 is a standard type 8048 microcomputer programmed in accordance with the following instructions:

```
ISIS-II MCS-48/UPI-41 MACRO ASSEMBLER, V3.0
PAGE1 - MIDIAN ELECTRONICS UNIVERSAL PAGING ENCODER

LOC  OBJ          LINE        SOURCE STATEMENT

                      $TITLE('PAGE1 - MIDIAN ELECTRONICS UNIVERSAL PAGING ENCODER - 6 NOV 80')
0000                          ORG     000H
0000 040D                     JMP     PAGE1

0007                          ORG     007H
                      $INCLUDE(:F1:TMRINT)
                  =   ;
                  =   ; TMRINT - TIMER INTERRUPT HANDLING ROUTINE.
                  =   ;
0007 C5           =   TMRINT: SEL     RB0                ; IN CASE WE'RE IN 'DELAY'
0008 EF0C         =           DJNZ    R7,TMRAD0          ; DECREMENT THE REMAINING TIME.
000A 04F7         =           JMP     SLEEP              ; TIMES UP - GO TO SLEEP.
000C 93           =   TMRAD0: RETR                       ; STILL TIME LEFT - RETURN.

                      $EJECT

000D 340B             PAGE1:  CALL    INTLZE             ; RESET ALL PORTS
000F 0A                       IN      A,P2               ; READ THE PROTOCOL SWITCH
0010 37                       CPL     A                  ; FIX THE COMPLEMENTARY BCD
0011 530F                     ANL     A,#0FH             ;  X
0013 03F7                     ADD     A,#-9              ; IS IT BETWEEN 0-8?
0015 F6F7                     JC      SLEEP              ; NO - IGNORE THE WAKEUP
0017 0323                     ADD     A,#LOW BRTBL+9     ; INDEX INTO THE BRANCH TABLE
0019 B3                       JMPP    @A                 ; EXECUTE THE SELECTED ROUTINE

001A 23               BRTBL:  DB      M2TONE
001B F7                       DB      MMETRO
001C 42                       DB      M5TONE
001D 42                       DB      M5TONE
001E 42                       DB      M5TONE
001F 42                       DB      M5TONE
0020 93                       DB      REACH
0021 93                       DB      REACH
0022 D3                       DB      GENEL

                      $EJECT INCLUDE(:F1:M2T100)

LOC  OBJ          LINE        SOURCE STATEMENT

                  =   ;
                  =   ; M2T100 - MOTOROLA 2-TONE CODE SELECT ENCODER
                  =   ;
0023 BA03         =   M2TONE: MOV     R2,#HIGH M2GPTB    ; LOAD ADDRESS OF THE MOTOROLA
0025 BBA5         =           MOV     R3,#LOW  M2GPTB    ;  GROUP PAIR TABLE
0027 5435         =           CALL    GET2TN             ; READ 3 KEYS
0029 3414         =           CALL    XMITON             ; KEY THE TRANSMITTER
002B BAD2         =           MOV     R2,#LOW MS1000     ; FIRST TONE FOR 1 SEC.
002D B821         =           MOV     R0,#KEY2           ; ARE THE TWO TONES THE SAME?
002F 14FD         =           CALL    CMP2TN             ;  X
0031 9637         =           JNZ     M2TAD2             ; NO - NORMAL PAGE
0033 BADE         =           MOV     R2,#LOW MS7000     ; YES- SET UP GROUP CALL
0035 043E         =           JMP     M2TAD3             ;  X
0037 34AF         =   M2TAD2: CALL    TONE               ; TRANSMIT 1ST TONE
```

```
0039 18          =  50            INC     R0              ; BUMP TO THE NEXT TONE
003A 545B        =  51            CALL    GAPCHK          ; GENERATE INTERTONE GAP, IF SELECTED
003C BAD8        =  52            MOV     R2,#LOW MS2000  ; SECOND TONE FOR 2 SEC.
003E 34AF        =  53 M2TAD3: CALL    TONE            ; TRANSMIT THE TONE
0040 04F7        =  54 M2TXIT: JMP     SLEEP           ; EXIT
                    55
                    56 $EJECT INCLUDE(:F1:M5TONE)


LOC  OBJ         LINE        SOURCE STATEMENT

                 =  57 ;
                 =  58 ; M5TONE - MOTOROLA 5-TONE ENCODING ROUTINE
                 =  59 ;
0042 B805        =  60 M5TONE: MOV     R0,#5           ; READ 5 KEYS INTO THE BUFFER
0044 541D        =  61            CALL    RDPGCD          ;  X
0046 3414        =  62            CALL    XMITON          ; KEY THE TRANSMITTER
0048 0A          =  63            IN      A,P2            ; FETCH THE ENCODER SELECT SWITCH
0049 5268        =  64            JB2     M5TAD1          ; NO PREAMBLE SELECTED - SKIP IT
004B B820        =  65            MOV     R0,#KBDBUF      ; POINT TO THE FIRST KEY IN THE BUFFER
004D F0          =  66            MOV     A,@R0           ; SET UP PREAMBLE TONE
004E AF          =  67            MOV     R7,A            ;  X
004F 09          =  68            IN      A,P1            ; FETCH THE PREAMBLE SELECT SWITCH
0050 37          =  69            CPL     A               ;  AND FIX THE COMPLEMENTARY BCD
0051 531F        =  70            ANL     A,#1FH          ;  X
0053 C65A        =  71            JZ      M5TAD0          ; USE THE FIRST TONE FOR THE PREAMBLE
0055 AF          =  72            MOV     R7,A            ; SAVE THE KEY
0056 03F5        =  73            ADD     A,#-11          ; IS THE KEY 0-9?
0058 F6F7        =  74            JC      SLEEP           ; NO - JUST FORGET THE WHOLE THING
005A B807        =  75 M5TAD0: MOV     R0,#7           ; YES- POINT AT R7
005C F0          =  76            MOV     A,@R0           ; ADJUST THE TONE POINTER
005D 033B        =  77            ADD     A,#(M5G-IPCTBL)/2-1; X
005F A0          =  78            MOV     @R0,A           ;  X
0060 BACC        =  79            MOV     R2,#LOW MS0690  ; SET TIME = 690 MSEC
0062 34AF        =  80            CALL    TONE            ; OUTPUT THE PREAMBLE
0064 232D        =  81            MOV     A,#45           ; 45 MSEC GAP
0066 3402        =  82            CALL    DELAY           ;  X
0068 BF05        =  83 M5TAD1: MOV     R7,#5           ; OUTPUT 5 TONES
006A B820        =  84            MOV     R0,#KBDBUF      ; POINT TO THE FIRST KEY IN THE BUFFER
006C 14FD        =  85 M5TLP0: CALL    CMP2TN          ; COMPARE THE NEXT 2 TONES
006E 9674        =  86            JNZ     M5TAD2          ; NO - LEAVE THEM ALONE
0070 18          =  87            INC     R0              ; YES- REPLACE THE 2ND WITH THE REPEAT T
                      ONE
0071 B00B        =  88            MOV     @R0,#11         ;  X
0073 C8          =  89            DEC     R0              ;  X
0074 233B        =  90 M5TAD2: MOV     A,#(M5G-IPCTBL)/2-1; POINT TO THE GROUP OF TONES
0076 60          =  91            ADD     A,@R0           ; INCREMENT TO THE KEY'S TONE
0077 A0          =  92            MOV     @R0,A           ; REPLACE ONTO THE BUFFER
0078 BAC3        =  93            MOV     R2,#LOW MS0033  ; SET TIME = 33 MSEC.
007A 34AF        =  94            CALL    TONE            ; OUTPUT THE NEXT TONE
007C 18          =  95            INC     R0              ; BUMP TO THE NEXT KEY
007D EF6C        =  96            DJNZ    R7,M5TLP0       ; LOOP UNTIL ALL TONES HAVE BEEN OUTPUT
007F B5          =  97            CPL     F1              ; HAS THE 'X' TONE BEEN REQUESTED?
0080 7685        =  98            JF1     M5TAD3          ; YES- PERFORM A 'CALL 2'
0082 0A          =  99            IN      A,P2            ; FETCH THE CODE TYPE SELECT SWITCH
0083 128D        = 100            JB0     M5TAD4          ; NO 'X' TONE - PERFORM DELAY
0085 B047        = 101 M5TAD3: MOV     @R0,#LOW M5TX   ; OUTPUT THE 'X' TONE
0087 BAC6        = 102            MOV     R2,#LOW MS0052  ;  FOR 52 MSEC.
0089 34AF        = 103            CALL    TONE            ;  X
008B 04F7        = 104            JMP     SLEEP           ; EXIT
008D 2334        = 105 M5TAD4: MOV     A,#52           ; WAIT 52 MSEC
008F 3402        = 106            CALL    DELAY           ;  X
0091 04F7        = 107            JMP     SLEEP           ; EXIT
                   108
                   109 $EJECT INCLUDE(:F1:REACH)
```

```
LOC  OBJ         LINE       SOURCE STATEMENT

                      ;
                      ; REACH - 2-TONE SEQUENTIAL PAGING ENCODER
                      ;
0093 BA03             REACH:  MOV     R2,#HIGH REGPTB ; LOAD ADDRESS OF THE REACH
0095 BBAF                     MOV     R3,#LOW REGPTB  ;  GROUP PAIR TABLE
0097 B801                     MOV     R0,#1           ; READ THE FIRST KEY
0099 541D                     CALL    RDPGCD          ;  X
009B 76A9                     JF1     REAAD1          ; WAS A '*' DETECTED?
009D 3414                     CALL    XMITON          ; YES- THIS IS A GROUP CALL
009F B820                     MOV     R0,#KBDBUF      ; CONVERT THE KEY TO IT'S TONE
00A1 2307                     MOV     A,#REG11P       ;  X
00A3 544C                     CALL    GETONE          ;  X
00A5 BADB                     MOV     R2,#LOW MS5000  ; GROUP CALL = 5 SECONDS
00A7 04CF                     JMP     REAAD2          ; SEND THE TONE
00A9 B802             REAAD1: MOV     R0,#2           ; READ THE NEXT 2 KEYS
00AB 5421                     CALL    RDPLPO          ;  X
00AD 5439                     CALL    GETADO          ; CONVERT THEM TO TONES
00AF B820                     MOV     R0,#KEY1        ; WAS THE FIRST KEY EVEN (0,2,4,6,8)?
00B1 F0                       MOV     A,@R0           ;  X
00B2 12BA                     JB0     REAAD0          ; NO - THE TONES ARE OK
00B4 18                       INC     R0              ; YES- SWAP THE ORDER OF THE
00B5 F0                       MOV     A,@R0           ;  TONES IN THE TABLE
00B6 18                       INC     R0              ;  X
00B7 20                       XCH     A,@R0           ;  X
00B8 C8                       DEC     R0              ;  X
00B9 A0                       MOV     @R0,A           ;  X
00BA 3414             REAAD0: CALL    XMITON          ; KEY THE TRANSMITTER
00BC B821                     MOV     R0,#KEY2        ; POINT TO THE FIRST TONE KEY
00BE BAC9                     MOV     R2,#LOW MS0150  ; SET UP FOR HIGHSPEED PAGE
00C0 0A                       IN      A,P2            ; READ THE PROTOCOL SWITCH
00C1 12C5                     JB0     $+4             ; WAS LOW SPEED SELECTED?
00C3 BAD8                     MOV     R2,#LOW MS2000  ; YES- SET FOR 2 SEC.
00C5 34AF                     CALL    TONE            ; TRANSMIT THE 1ST TONE
00C7 18                       INC     R0              ; BUMP TO THE 2ND TONE
00C8 BAC9                     MOV     R2,#LOW MS0150  ; SET UP FOR HIGH SPEED PAGE
00CA 0A                       IN      A,P2            ; READ THE PROTOCOL SWITCH
00CB 12CF                     JB0     $+4             ; WAS LOW SPEED SELECTED?
00CD BACF                     MOV     R2,#LOW MS0700  ; YES- 2ND TONE=700 MSEC.
00CF 34AF             REAAD2: CALL    TONE            ; TRANSMIT THE SECOND TONE
00D1 04F7                     JMP     SLEEP           ; EXIT

                      $EJECT INCLUDE(:F1:GENEL)

LOC  OBJ         LINE       SOURCE STATEMENT

                      ;
                      ; GENEL - GENERAL ELECTRIC 2-TONE PAGING ENCODER
                      ;
00D3 BA03             GENEL:  MOV     R2,#HIGH GEGPTB ; LOAD ADDRESS OF THE
00D5 BBB9                     MOV     R3,#LOW GEGPTB  ;  GE GROUP PAIR TABLE
00D7 5435                     CALL    GET2TN          ; READ 3 KEYS AND LOOK UP THE 2 TONES
00D9 B820                     MOV     R0,#KEY1        ; IS THE FIRST KEY A '9'?
00DB F0                       MOV     A,@R0           ;  X
00DC D309                     XRL     A,#9            ;  X
00DE C6F5                     JZ      GEAD0           ; YES- IT'S AN INVALID CODE
00E0 3414                     CALL    XMITON          ; NO - KEY THE TRANSMITTER
00E2 B821                     MOV     R0,#KEY2        ; ARE THE 2 TONES THE SAME?
00E4 14FD                     CALL    CMP2TN          ;  X
00E6 96EA                     JNZ     $+4             ; NO - THEY'RE OK
00E8 B093                     MOV     @R0,#GEDIAG     ; YES- USE DIAGONAL AS FIRST TONE
00EA BAD2                     MOV     R2,#LOW MS1000  ; 1ST TONE = 1 SEC
00EC 34AF                     CALL    TONE            ; TRANSMIT TONE 1
00EE 18                       INC     R0              ; BUMP TO THE NEXT TONE
00EF 545B                     CALL    GAPCHK          ; CHECK FOR INTERTONE GAP SELECT
00F1 BAD5                     MOV     R2,#LOW MS1500  ; 2ND TONE = 1.5 SEC
00F3 34AF                     CALL    TONE            ; TRANSMIT TONE 2
00F5 04F7             GEAD0:  JMP     SLEEP           ; GO BACK TO SLEEP
```

```
                 $EJECT

                 ;M2TONE EQU     $
00F7             MMETRO  EQU     $
                 ;M5TONE EQU     $
                 ;REACH  EQU     $
                 ;GENEL  EQU     $
                 $INCLUDE(:F1:SLEEP)
               = ;
               = ; SLEEP - TURN THE 8048 OFF.
               = ;
00F7 340B      = SLEEP:  CALL    INTLZE          ; RESET ALL PORTS.
00F9 9AEF      =         ANL     P2,#NOT XKPAWK  ; TURN OFF KEEP-AWAKE BIT.
00FB 0400      =         JMP     000H            ; START OVER AGAIN.

                 $EJECT INCLUDE(:F1:CMP2TN)

               = ;
               = ; CMP2TN - COMPARE THE NEXT TWO TONES FOR EQUALITY
               = ;
00FD F0        = CMP2TN: MOV     A,@R0           ; FETCH THE FIRST TONE
00FE 18        =         INC     R0              ;  X
00FF D0        =         XRL     A,@R0           ; MASK AGAINST 2ND TONE
0100 C8        =         DEC     R0              ;  X
0101 83        =         RET                     ; EXIT

                 $EJECT INCLUDE(:F1:DELAY)

LOC  OBJ         LINE        SOURCE STATEMENT

               = ;
               = ; DELAY ROUTINE- WAITS (ACC) MSEC., THEN RETURNS.
               = ;
0102 D5        = DELAY:  SEL     RB1
0103 BF77      = DELLPO: MOV     R7,#119         ; (ASSUMES A 3.58 MHZ XTAL)
0105 EF05      =         DJNZ    R7,$            ; THUMB-TWIDDLING TIME.
0107 07        =         DEC     A               ; COUNT MSEC.
0108 9603      =         JNZ     DELLPO          ; LOOP UNTIL FINISHED.
010A 93        =         RETR

                 $EJECT INCLUDE(:F1:PINTLZ)

               = ;
               = ; INTLZE - INITIALIZE THE OUTPUT PORTS.
               = ;
010B 65        = INTLZE: STOP    TCNT            ; DISABLE THE TIMEOUT CLOCK
               =
010C 80        =         MOVX    A,@R0           ; BUS IS AN INPUT PORT.
               =
010D 23FF      =         MOV     A,#0FFH         ; PORT 1 = ONES.
010F 39        =         OUTL    P1,A            ;  X
               =
0110 231F      =         MOV     A,#0FH OR XKPAWK; PORT 2 = KEEP AWAKE
0112 3A        =         OUTL    P2,A            ;  X
               =
0113 83        =         RET                     ; RETURN TO THE CALLING ROUTINE.

                 $EJECT INCLUDE(:F1:XMITON)

               = ;
               = ; XMITON - KEYS THE TRANSMITTER AND WAITS 250 MSEC.
               = ;
0114 09        = XMITON: IN      A,P1            ; WAIT FOR TRANSMIT REQUEST
0115 5320      =         ANL     A,#XDLYTX       ;  X
0117 C614      =         JZ      XMITON          ;  X
0119 8A20      =         ORL     P2,#XPTT        ; KEY THE PUSH-TO-TALK OUTPUT
011B BF02      =         MOV     R7,#2           ;  AND WAIT FOR IT TO WARM UP
011D 23FA      = XMILPO: MOV     A,#250          ;  X
011F 3402      =         CALL    DELAY           ;  X
0121 EF1D      =         DJNZ    R7,XMILPO       ;  X
0123 83        =         RET                     ; EXIT

                 $EJECT INCLUDE(:F1:PKBDIN)
```

```
LOC  OBJ          LINE        SOURCE STATEMENT

                  =       ;
                  =       ; KBDINP - KEYBOARD INPUT ROUTINE.
                  =       ;
0124 BFCB         =       KBDINP: MOV    R7,#KTMLIM      ; INITIALIZE THE WATCHDOG.
0126 55           =               STRT   T               ;  X
0127 25           =               EN     TCNTI           ;  X
                  =
0128 3450         =               CALL   KBDSBO          ; READ THE KEYBOARD.
012A C628         =               JZ     $-2             ; NO KEY PRESSED - TRY AGAIN.
                  =
012C AE           =               MOV    R6,A            ; SAVE THE KEY
012D BCF0         =               MOV    R4,#240         ; OUTPUT THE KEY ACKNOWLEDGE TONE
012F BD2D         =       KBDLP1: MOV    R5,#45          ;  X
0131 ED31         =               DJNZ   R5,$            ;  X
0133 0A           =               IN     A,P2            ;  X
0134 D340         =               XRL    A,#XAUDRX       ;  X
0136 3A           =               OUTL   P2,A            ;  X
0137 EC2F         =               DJNZ   R4,KBDLP1       ;  X
0139 FE           =               MOV    A,R6            ; RESTORE THE KEY VALUE
013A 85           =               CLR    F0              ; SET THE CLEAR-KEY FLAG.
013B 95           =               CPL    F0              ;  X
                  =
013C BFCB         =       KBDLP0: MOV    R7,#KTMLIM      ; RESET THE KEY-PRESSED TIMEOUT.
013E AE           =               MOV    R6,A            ; SAVE THE KEY.
013F D30D         =               XRL    A,#XCLEAR       ; IS IT THE 'CLEAR' KEY?
0141 9644         =               JNZ    $+3             ; NO - GO READ THE NEXT KEY.
0143 85           =               CLR    F0              ; CLEAR THE CLEAR-BUFFER FLAG.
0144 3450         =               CALL   KBDSBO          ; READ THE KEYBOARD.
0146 963C         =               JNZ    KBDLPO          ; KEY PRESSED - LOOP.
                  =
0148 65           =               STOP   TCNT            ; DISABLE THE WATCHDOG TIMER.
0149 FE           =               MOV    A,R6            ; RESTORE THE LAST KEY PRESSED.
014A B64F         =               JFO    KBDAD4          ; WAS THE 'CLEAR' KEY DETECTED?
014C 230D         =               MOV    A,#XCLEAR       ; YES- PASS BACK IT'S VALUE.
014E AE           =               MOV    R6,A            ;  X
                  =
014F 93           =       KBDAD4: RETR                   ; RETURN TO THE CALLING ROUTINE.
                  =
0150 BD00         =       KBDSBO: MOV    R5,#0           ; CLEAR THE DEBOUNCE COUNTER.
0152 08           =       KBDSOA: INS    A,BUS           ; READ THE KEYBOARD.
0153 4380         =               ORL    A,#B0H          ; MASK OFF THE TOUCH-TONE JUMPER
0155 2C           =               XCH    A,R4            ; SAVE THE NEW PATTERN.
0156 DC           =               XRL    A,R4            ; IS IT THE SAME AS THE OLD ONE?
0157 9650         =               JNZ    KBDSBO          ; NO - RESET DEBOUNCE COUNTER.
0159 ED52         =               DJNZ   R5,KBDSOA       ; YES- WAIT TILL WE'RE SURE IT'S OK.
                  =
015B BD0E         =               MOV    R5,#KEYTBX-KEYTBL ; LOAD THE NO. OF ENTRIES.
015D 23E0         =       KBDSOB: MOV    A,#LOW KEYTBL-1 ; FETCH THE NEXT PATTERN.
015F 6D           =               ADD    A,R5            ;  X
0160 E3           =               MOVP3  A,@A            ;  X
0161 DC           =               XRL    A,R4            ; DO THE PATTERNS MATCH?
0162 C668         =               JZ     KBDSOC          ; YES- RETURN THE KEY'S VALUE.
0164 ED5D         =               DJNZ   R5,KBDSOB       ; NO - KEEP LOOKING.
                  =
0166 2450         =               JMP    KBDSBO          ; NOT A VALID KEY - TRY AGAIN.

LOC  OBJ          LINE        SOURCE STATEMENT

                  =
0168 FD           =       KBDSOC: MOV    A,R5            ; FETCH THE TABLE POINTER.
0169 07           =               DEC    A               ; ADJUST THE VALUE.
016A 83           =               RET                    ; RETURN TO CALLING ROUTINE.

                          $EJECT INCLUDE(:F1:DIVIDE)

                  =       ;
                  =       ; DIVIDES R2-5 BY R6-7. RESULT IN R2-3.
                  =
                  =       ;
```

```
                ;
                ;        INPUTS: R2 THROUGH R7.
                ;
                ;        OUTPUTS: R2&R3.
                ;
                ;        SUBROUTINES CALLED: NONE.
                ;
                ;        REGISTERS USED: RB0 - ALL
                ;
                ;        EXIT:  TO CALLING ROUTINE
                ;
016B B810       DIVIDE: MOV     R0,#16          ; R0 IS THE MAIN LOOP COUNTER.
016D 97         DIVLP0: CLR     C               ; SHIFT R2-5 LEFT ONE BIT INTO THE CARRY

016E FD                 MOV     A,R5            ;  X
016F F7                 RLC     A               ;  X
0170 AD                 MOV     R5,A            ;  X
0171 FC                 MOV     A,R4            ;  X
0172 F7                 RLC     A               ;  X
0173 AC                 MOV     R4,A            ;  X
0174 FB                 MOV     A,R3            ;  X
0175 F7                 RLC     A               ;  X
0176 AB                 MOV     R3,A            ;  X
0177 FA                 MOV     A,R2            ;  X
0178 F7                 RLC     A               ;  X
0179 AA                 MOV     R2,A            ;  ALL DONE.
017A E685               JNC     DIVAD0          ; NO OVERFLOW - CHECK FOR VALID SUBTRACT

LOC  OBJ        LINE    SOURCE STATEMENT

017C FB                 MOV     A,R3            ; OVERFLOW - SUBTRACT FOR SURE.
017D 37                 CPL     A               ;  X
017E 6F                 ADD     A,R7            ;  X
017F FA                 MOV     A,R2            ;  X
0180 37                 CPL     A               ;  X
0181 7E                 ADDC    A,R6            ;  X
0182 37                 CPL     A               ;  X
0183 248E               JMP     DIVAD1          ;  GO STORE THE RESULT.
0185 FB         DIVAD0: MOV     A,R3            ; TRY TO PERFORM SUBTRACTION.
0186 37                 CPL     A               ;  X
0187 6F                 ADD     A,R7            ;  X
0188 FA                 MOV     A,R2            ;  X
0189 37                 CPL     A               ;  X
018A 7E                 ADDC    A,R6            ;  X
018B 37                 CPL     A               ;  X
018C F695               JC      DIVAD2          ; OOPS - SKIP THE SUBTRACT THIS TIME
018E AA         DIVAD1: MOV     R2,A            ; NOW IT'S OK TO SAVE THE RESULTS.
018F FB                 MOV     A,R3            ;  X
0190 37                 CPL     A               ;  X
0191 6F                 ADD     A,R7            ;  X
0192 37                 CPL     A               ;  X
0193 AB                 MOV     R3,A            ;  X
0194 1D                 INC     R5              ; SET LSB OF QUOTIENT.

0195 E86D       DIVAD2: DJNZ    R0,DIVLP0       ; LOOP FOR NEXT SHIFT.
0197 97                 CLR     C
0198 FB                 MOV     A,R3
0199 F7                 RLC     A
019A AB                 MOV     R3,A
019B FA                 MOV     A,R2
019C F7                 RLC     A
019D AA                 MOV     R2,A
019E FB                 MOV     A,R3            ; ROUND OFF TO 16 BITS
019F 37                 CPL     A
01A0 6F                 ADD     A,R7
01A1 FA                 MOV     A,R2
01A2 37                 CPL     A
01A3 7E                 ADDC    A,R6
01A4 F6AE               JC      DIVAD3
01A6 97                 CLR     C
01A7 FD                 MOV     A,R5
```

```
01A8 0301      = 372           ADD     A,#1            ; ADD 1 IF REMAINDER > DIVISOR/2
01AA AD        = 373           MOV     R5,A
01AB 27        = 374           CLR     A
01AC 7C        = 375           ADDC    A,R4
01AD AC        = 376           MOV     R4,A
01AE 83        = 377 DIVAD3:   RET                     ; RETURN TO MAIN ROUTINE.
                 378
                 379 $EJECT INCLUDE(:F1:TONE)

LOC  OBJ         LINE        SOURCE STATEMENT

               = 380 ;
               = 381 ; TIMING CALCULATION ROUTINE FOR PAGING TONES
               = 382 ;
01AF B91B      = 383 TONE:     MOV     R1,#18H+3       ; R1 = ADDR. OF RB1 REGISTERS
01B1 BE03      = 384           MOV     R6,#3           ; R6 = # OF BYTES TO BE FETCHED
01B3 FA        = 385 TONLPO:   MOV     A,R2            ; FETCH THE NEXT BYTE OF THE
01B4 E3        = 386           MOVP3   A,@A            ;  INST.-PER-TONE TABLE
01B5 A1        = 387           MOV     @R1,A           ; STORE IN THE ADDRESSED REGISTER
01B6 19        = 388           INC     R1              ; BUMP THE REGISTER POINTER
01B7 1A        = 389           INC     R2              ;  "   "  TABLE    "
01B8 EEB3      = 390           DJNZ    R6,TONLPO       ; LOOP 'TILL FINISHED
01BA BA02      = 391           MOV     R2,#HIGH IPCTBL ; INDEX INTO THE INSTRUCTION/CYCLE
01BC BB6E      = 392           MOV     R3,#LOW IPCTBL  ;  TABLE BY 2*TONE#
01BE F0        = 393           MOV     A,@R0           ;  X
01BF 60        = 394           ADD     A,@R0           ;  X
01C0 E6C3      = 395           JNC     $+3             ;  X
01C2 1A        = 396           INC     R2              ;  X
01C3 6B        = 397           ADD     A,R3            ;  X
01C4 AB        = 398           MOV     R3,A            ;  X
01C5 27        = 399           CLR     A               ;  X
01C6 7A        = 400           ADDC    A,R2            ;  X
01C7 AA        = 401           MOV     R2,A            ;  X
01C8 5465      = 402           CALL    CLOAD           ; FETCH THE HIGH BYTE OF THE TONE
01CA A1        = 403           MOV     @R1,A           ;  AND SAVE IN RB1.R6
01CB 19        = 404           INC     R1              ; BUMP TO THE NEXT REGISTER
01CC 1B        = 405           INC     R3              ; BUMP THE TABLE POINTER
01CD FB        = 406           MOV     A,R3            ;  X
01CE 96D1      = 407           JNZ     $+3             ;  X
01D0 1A        = 408           INC     R2              ;  X
01D1 5465      = 409           CALL    CLOAD           ; FETCH THE LOW BYTE
01D3 A1        = 410           MOV     @R1,A           ;  AND SAVE IN RB1.R7
01D4 D5        = 411           SEL     RB1             ; COMPUTE THE CYCLES/TONE
01D5 BA00      = 412           MOV     R2,#0           ;  X
01D7 346B      = 413           CALL    DIVIDE          ;  X
01D9 34E4      = 414           CALL    GENTON          ; TRANSMIT THE TONE
01DB 93        = 415           RETR                    ; EXIT
                 416
01E4             417           ORG     $+8
                 418 $EJECT INCLUDE(:F1:GENTON)

LOC  OBJ         LINE        SOURCE STATEMENT

               = 419 ;
               = 420 ; TONE GENERATING AND TIMING ROUTINE
               = 421 ;
01E4 FF        = 422 GENTON:   MOV     A,R7            ; R67 = R67 - 40 XOR 03H SHL 6
01E5 03D8      = 423           ADD     A,#LOW(-40)     ;  X
01E7 D303      = 424           XRL     A,#03H          ;  X
01E9 AF        = 425           MOV     R7,A            ;  X
01EA FE        = 426           MOV     A,R6            ;  X
01EB 13FF      = 427           ADDC    A,#HIGH(-40)    ;  X
01ED AE        = 428           MOV     R6,A            ;  X
01EE B906      = 429           MOV     R1,#6           ;  X
01F0 FF        = 430 GENLP1:   MOV     A,R7            ;  X
01F1 F7        = 431           RLC     A               ;  X
01F2 AF        = 432           MOV     R7,A            ;  X
01F3 FE        = 433           MOV     A,R6            ;  X
01F4 F7        = 434           RLC     A               ;  X
```

```
01F5 AE          = 435           MOV     R6,A            ;  X
01F6 E9F0        = 436           DJNZ    R1,GENLP1       ;  X
01F8 FE          = 437 GENLP0:   MOV     A,R6            ; FETCH THE LOOP DELAY
01F9 AA          = 438           MOV     R2,A            ;  X
01FA FF          = 439           MOV     A,R7            ; ADDITIONAL INST. PER CYCLE?
01FB F2FE        = 440           JB7     $+3             ; NO - EVEN NO. OF INSTRUCTIONS
01FD 00          = 441           NOP                     ; YES- ODD   "  "      "
01FE 95          = 442           CPL     F0              ; FLIP HALF-CYCLE FLAG
01FF B608        = 443           JF0     GENAD0          ; NO COMPENSATION THIS TIME
0201 CA          = 444           DEC     R2              ; ADJUST THE DELAY TIME
0202 CA          = 445           DEC     R2              ;  X
0203 CA          = 446           DEC     R2              ;  X
0204 D207        = 447           JB6     $+3             ; ADDITIONAL INST. THIS HALF-CYCLE?
0206 00          = 448           NOP                     ; YES-
0207 00          = 449           NOP                     ; TIMING ADJUSTMENT
0208 FD          = 450 GENAD0:   MOV     A,R5            ; FETCH THE LSB OF THE HALF-CYCLE CO
                       R
0209 CD          = 451           DEC     R5              ; IS THERE A BORROW FROM THE MSB?
020A 9614        = 452           JNZ     GENAD1          ; NO - PROCEED
020C CA          = 453           DEC     R2              ; YES- ADJUST THE DELAY TIME
020D CA          = 454           DEC     R2              ;  X
020E CA          = 455           DEC     R2              ;  X
020F CA          = 456           DEC     R2              ;  X
0210 FC          = 457           MOV     A,R4            ; FETCH THE MSB OF THE HALF-CYCLE COU
                       R
0211 CC          = 458           DEC     R4              ; HAS THE COUNTER UNDERFLOWED?
0212 C61C        = 459           JZ      GENXIT          ; YES- ALL DONE
0214 EA14        = 460 GENAD1:   DJNZ    R2,$            ; FINISH HALF-CYCLE DELAY
0216 0A          = 461           IN      A,P2            ; TOGGLE THE OUTPUT PORT
0217 D380        = 462           XRL     A,#XAUDTX       ;  X
0219 3A          = 463           OUTL    P2,A            ;  X
021A 24F8        = 464           JMP     GENLP0          ; LOOP FOR NEXT HALF-CYCLE
021C 83          = 465 GENXIT:   RET                     ; EXIT TO CALLING ROUTINE
                   466
                   467 $EJECT INCLUDE(:F1:RDPGCD)

LOC  OBJ           LINE        SOURCE STATEMENT

                 = 468 ;
                 = 469 ; RDPGCD - READS A VARIABLE NO. OF KEYS INTO THE BUFFER
                 = 470 ;
021D A5          = 471 RDPGCD:   CLR     F1              ; F1 INDICATES WHETHER A '*'
021E B5          = 472           CPL     F1              ;  HAS BEEN ENTERED
021F B920        = 473           MOV     R1,#KBDBUF      ; R1 POINTS TO THE NEXT FREE LOCATION
0221 3424        = 474 RDPLP0:   CALL    KBDINP          ; READ 1 KEY INPUT
0223 03F5        = 475           ADD     A,#-11          ; IS IT A '*'?
0225 962A        = 476           JNZ     RDPAD0          ; NO - CHECK FOR A BUFFER CLEAR KEY
0227 A5          = 477           CLR     F1              ; YES- SET THE FLAG
0228 4421        = 478           JMP     RDPLP0          ; KEEP READING THE KEYBOARD
022A E62E        = 479 RDPAD0:   JNC     RDPAD1          ; WAS IT A BUFFER CLEAR KEY?
022C 04F7        = 480           JMP     SLEEP           ; YES- RESTART
022E 030B        = 481 RDPAD1:   ADD     A,#11           ; NO - MOVE IT TO THE BUFFER
0230 A1          = 482           MOV     @R1,A           ;  X
0231 19          = 483           INC     R1              ; BUMP TO THE NEXT BUFFER LOCATION
0232 E821        = 484           DJNZ    R0,RDPLP0       ; READ THE NEXT KEY
0234 83          = 485           RET                     ; EXIT
                   486
                   487 $EJECT INCLUDE(:F1:GET2TN)
                 = 488 ;
                 = 489 ; GET2TN - READS 3 DIGITS AND LOOKS UP THE PROPER TONE INDEX
                 = 490 ;
0235 B803        = 491 GET2TN:   MOV     R0,#3           ; READ 3 KEYS
0237 541D        = 492           CALL    RDPGCD          ;  X
0239 B820        = 493 GETAD0:   MOV     R0,#KEY1        ; INDEX = KEY1-1
023B F0          = 494           MOV     A,@R0           ;  X
023C 07          = 495           DEC     A               ;  X
023D 6B          = 496           ADD     A,R3            ; INDEX INTO THE GROUP PAIR TABLE
023E AB          = 497           MOV     R3,A            ;  X
023F 27          = 498           CLR     A               ;  X
0240 7A          = 499           ADDC    A,R2            ;  X
```

```
0241 AA      =              MOV     R2,A              ;  X
0242 5465    =              CALL    CLOAD             ; FETCH THE BYTE FROM CODE MEMORY
0244 A9      =              MOV     R1,A              ; SAVE THE GROUP PAIR
0245 47      =              SWAP    A                 ; MOVE THE FIRST GROUP TO THE LOWER BY
0246 B821    =              MOV     R0,#KEY2          ; POINT TO THE ASSOCIATED KEY
0248 544C    =              CALL    GETONE            ; LOOK UP THE TONE INDEX
024A 18      =              INC     R0                ; BUMP TO THE NEXT KEY
024B F9      =              MOV     A,R1              ; REFETCH THE GROUP
             =
024C 530F    =  GETONE:     ANL     A,#0FH            ; MASK OFF THE GROUP INDEX
024E 0396    =              ADD     A,#LOW GRPTBL     ; INDEX INTO THE GROUP ADDRESS TABLE
0250 AB      =              MOV     R3,A              ;  X
0251 27      =              CLR     A                 ;  X
0252 1303    =              ADDC    A,#HIGH GRPTBL    ;  X
0254 AA      =              MOV     R2,A              ;  X
0255 5465    =              CALL    CLOAD             ; FETCH THE GROUP START DISPLACEMENT
0257 60      =              ADD     A,@R0             ; INCREMENT BY THE KEY VALUE
0258 07      =              DEC     A                 ;  MINUS 1
0259 A0      =              MOV     @R0,A             ; REPLACE THE KEY VALUE WITH THE TONE
                 DEX
025A 83      =              RET                       ; EXIT

                $EJECT INCLUDE(:F1:GAPCHK)
             =  ;
             =  ; GAPCHK - GENERATES A 250 MSEC GAP IF JUMPER IS PRESENT
             =
025B 09      =  GAPCHK:     IN      A,P1              ; READ THE JUMPER FIELD
025C 5340    =              ANL     A,#XGAPSL         ; IS GAP JUMPER PRESENT?
025E 9664    =              JNZ     GAPADO            ; NO - RETURN IMMEDIATELY
0260 23FA    =              MOV     A,#250            ; YES- WAIT 250 MSEC
0262 3402    =              CALL    DELAY             ;  X
0264 83      =  GAPADO:     RET                       ; EXIT

                $EJECT INCLUDE(:F1:CLOAD)

             =              IF      $ LT 200H
             =              ORG     200H
             =              ENDIF
             =  ;
             =  ; CLOAD - LOADS 1 BYTE FROM CODE MEMORY @R23 INTO THE ACCUMULATOR
             =  ;
0265 FA      =  CLOAD:      MOV     A,R2              ; LOAD THE CODE PAGE
0266 126B    =              JB0     CLOAD3            ; PAGE 3 REQUESTED
0268 FB      =              MOV     A,R3              ; FETCH THE BYTE FROM PAGE 2
0269 A3      =              MOVP    A,@A              ;  X
026A 83      =              RET                       ; EXIT
             =
026B FB      =  CLOAD3:     MOV     A,R3              ; FETCH THE BYTE FROM PAGE 3
026C E3      =              MOVP3   A,@A              ;  X
026D 83      =              RET                       ; EXIT

                $EJECT

                ;
                ; IPCTBL - TABLE OF INSTRUCTIONS/SEC FOR EACH TONE
                ;
026E            IPCTBL  EQU     $
                $INCLUDE(:F1:M2IPC)
026E 02AC    =  M2G1:       DW      684               ; 11 - 348.9
0270 0288    =              DW      648               ; 12 - 368.3
0272 0265    =              DW      613               ; 13 - 389.3
0274 0245    =              DW      581               ; 14 - 410.7
0276 0226    =              DW      550               ; 15 - 433.9
0278 0209    =              DW      521               ; 16 - 458.0
027A 01EE    =              DW      494               ; 17 - 483.1
027C 01D3    =              DW      467               ; 18 - 511.0
027E 01BB    =              DW      443               ; 19 - 538.7
0280 02D2    =              DW      722               ; 10 - 330.5
0282 018D    =  M2G2:       DW      397               ; 21 - 601.1
```

```
02B4 0178      = 566          DW       376              ; 22 - 634.7
02B6 0164      = 567          DW       356              ; 23 - 670.3
02B8 0151      = 568          DW       337              ; 24 - 708.1
028A 0140      = 569          DW       320              ; 25 - 745.7
028C 012F      = 570          DW       303              ; 26 - 787.6
028E 011F      = 571          DW       287              ; 27 - 831.5
0290 010F      = 572          DW       271              ; 28 - 880.6
0292 0101      = 573          DW       257              ; 29 - 928.5
0294 01A3      = 574          DW       419              ; 20 - 569.5
0296 033B      = 575 M2G3:    DW       827              ; 31 - 288.6
0298 0325      = 576          DW       805              ; 32 - 296.4
029A 030F      = 577          DW       783              ; 33 - 304.8
029C 02FA      = 578          DW       762              ; 34 - 313.2
029E 00FA      = 579          DW       250              ; 35 - 954.5
02A0 00F4      = 580          DW       244              ; 36 - 978.0
02A2 00ED      = 581          DW       237              ; 37 -1006.9
02A4 00E7      = 582          DW       231              ; 38 -1033.1
02A6 00E0      = 583          DW       224              ; 39 -1065.3
02A8 00DA      = 584          DW       218              ; 30 -1094.7
02AA 02BF      = 585 M2G4:    DW       703              ; 41 - 339.5
02AC 0299      = 586          DW       665              ; 42 - 358.9
02AE 0276      = 587          DW       630              ; 43 - 378.9
02B0 0255      = 588          DW       597              ; 44 - 399.7
02B2 0235      = 589          DW       565              ; 45 - 422.4
02B4 0217      = 590          DW       535              ; 46 - 446.0
02B6 01FB      = 591          DW       507              ; 47 - 470.7
02B8 01E0      = 592          DW       480              ; 48 - 497.2
02BA 01C7      = 593          DW       455              ; 49 - 524.5
02BC 02E6      = 594          DW       742              ; 40 - 321.6
02BE 0198      = 595 M2G5:    DW       408              ; 51 - 584.7
02C0 0183      = 596          DW       387              ; 52 - 616.6
02C2 016E      = 597          DW       366              ; 53 - 652.0
02C4 015B      = 598          DW       347              ; 54 - 687.7
02C6 0148      = 599          DW       328              ; 55 - 727.5
02C8 0137      = 600          DW       311              ; 56 - 767.3
02CA 0127      = 601          DW       295              ; 57 - 808.9
02CC 0117      = 602          DW       279              ; 58 - 855.3
02CE 0108      = 603          DW       264              ; 59 - 903.9
02D0 01AF      = 604          DW       431              ; 50 - 553.7
02D2 00CF      = 605 M2G6:    DW       207
02D4 00C9      = 606          DW       201
02D6 00C4      = 607          DW       196
02D8 00BF      = 608          DW       191
02DA 00BA      = 609          DW       186
02DC 00B5      = 610          DW       181
02DE 00B0      = 611          DW       176
02E0 00AB      = 612          DW       171
02E2 00A6      = 613          DW       166
02E4 00D5      = 614          DW       213
                 615 $INCLUDE(:F1:M5IPC)
02E6 0142      = 616 M5G:     DW       322
02E8 010F      = 617          DW       271
02EA 00E9      = 618          DW       233
02EC 00CD      = 619          DW       205
02EE 00B7      = 620          DW       183
02F0 00A5      = 621          DW       165
02F2 0096      = 622          DW       150
02F4 008A      = 623          DW       138
02F6 0080      = 624          DW       128
02F8 018E      = 625          DW       398
0046           = 626 M5TREP   EQU      ($-IPCTBL)/2
02FA 0208      = 627          DW       520
0047           = 628 M5TX     EQU      ($-IPCTBL)/2
02FC 0077      = 629          DW       119
                 630 $INCLUDE(:F1:REIPC)
02FE 0058      = 631 REG11:   DW       88
0300 005B      = 632          DW       91
0302 005F      = 633          DW       95
0304 0062      = 634          DW       98
```

```
0306 0065      = 635         DW     101
0308 0069      = 636         DW     105
030A 006D      = 637         DW     109
030C 0071      = 638         DW     113
030E 0074      = 639         DW     116
0310 0079      = 640         DW     121
0312 007D      = 641 REG21:  DW     125
0314 0081      = 642         DW     129
0316 0086      = 643         DW     134
0318 008B      = 644         DW     139
031A 008F      = 645         DW     143
031C 0094      = 646 REG26:  DW     148
031E 009A      = 647         DW     154
0320 009F      = 648         DW     159
0322 00A5      = 649         DW     165
0324 00AA      = 650         DW     170
0326 00B1      = 651         DW     177
0328 00B7      = 652         DW     183
032A 00BD      = 653         DW     189
032C 00C4      = 654         DW     196
032E 00CB      = 655         DW     203
0330 00D2      = 656 REG36:  DW     210
0332 00D9      = 657         DW     217
0334 00E1      = 658         DW     225
0336 00E9      = 659         DW     233
0338 00F1      = 660         DW     241
033A 00FA      = 661         DW     250
033C 0103      = 662         DW     259
033E 010C      = 663         DW     268
0340 0115      = 664         DW     277
0342 011F      = 665         DW     287
0344 0129      = 666 REG46:  DW     297
0346 0134      = 667         DW     308
0348 013E      = 668         DW     318
034A 0149      = 669         DW     329
034C 0155      = 670         DW     341
034E 0161      = 671         DW     353
0350 016D      = 672         DW     365
0352 017A      = 673         DW     378
0354 0188      = 674         DW     392
0356 0196      = 675         DW     406
                 676 $INCLUDE(:F1:GEIPC)
0358 0326      = 677 GEGA:   DW     806
035A 0276      = 678         DW     630
035C 0253      = 679         DW     595
035E 0233      = 680         DW     563
0360 0217      = 681         DW     535
0362 01FD      = 682         DW     509
0364 0368      = 683         DW     872
0366 0290      = 684         DW     656
0368 02ED      = 685         DW     749
036A 02BB      = 686         DW     699
036C 0312      = 687 GEGB:   DW     786
036E 025E      = 688         DW     606
0370 023D      = 689         DW     573
0372 0220      = 690         DW     544
0374 0205      = 691         DW     517
0376 01ED      = 692         DW     493
0378 039A      = 693         DW     922
037A 0350      = 694         DW     848
037C 02AC      = 695         DW     684
037E 02DB      = 696         DW     731
0380 029E      = 697 GEGC:   DW     670
0382 026A      = 698         DW     618
0384 024B      = 699         DW     584
0386 0229      = 700         DW     553
0388 020E      = 701         DW     526
038A 01F5      = 702         DW     501
038C 0380      = 703         DW     896
038E 033A      = 704         DW     826
```

```
0390 02FF        =                DW      767
0392 02CB        =                DW      715
0093             =    GEDIAG      EQU     ($-IPCTBL)/2
0394 0283        =                DW      643

                      $EJECT
                      ;
                      ; GRPTBL - TABLE OF GROUP STARTING ADDRESSES
                      ;
0396                  GRPTBL      EQU     $
                      $INCLUDE(:F1:M2GRP)
0000             =    M2G1P       EQU     $-GRPTBL
0396 00          =                DB      (M2G1-IPCTBL)/2
0001             =    M2G2P       EQU     $-GRPTBL
0397 0A          =                DB      (M2G2-IPCTBL)/2
0002             =    M2G3P       EQU     $-GRPTBL
0398 14          =                DB      (M2G3-IPCTBL)/2
0003             =    M2G4P       EQU     $-GRPTBL
0399 1E          =                DB      (M2G4-IPCTBL)/2
0004             =    M2G5P       EQU     $-GRPTBL
039A 28          =                DB      (M2G5-IPCTBL)/2
0005             =    M2G6P       EQU     $-GRPTBL
039B 32          =                DB      (M2G6-IPCTBL)/2
                      ;$INCLUDE(:F1:MMGRP)
                      $INCLUDE(:F1:M5GRP)
0006             =    M5GP        EQU     $-GRPTBL
039C 3C          =                DB      (M5G-IPCTBL)/2
                      $INCLUDE(:F1:REGRP)
0007             =    REG11P      EQU     $-GRPTBL
039D 48          =                DB      (REG11-IPCTBL)/2
0008             =    REG21P      EQU     $-GRPTBL
039E 52          =                DB      (REG21-IPCTBL)/2
0009             =    REG26P      EQU     $-GRPTBL
039F 57          =                DB      (REG26-IPCTBL)/2
000A             =    REG36P      EQU     $-GRPTBL
03A0 61          =                DB      (REG36-IPCTBL)/2
000B             =    REG46P      EQU     $-GRPTBL
03A1 6B          =                DB      (REG46-IPCTBL)/2
                      $INCLUDE(:F1:GEGRP)
000C             =    GEGAP       EQU     $-GRPTBL
03A2 75          =                DB      (GEGA-IPCTBL)/2
000D             =    GEGBP       EQU     $-GRPTBL
03A3 7F          =                DB      (GEGB-IPCTBL)/2
000E             =    GEGCP       EQU     $-GRPTBL
03A4 89          =                DB      (GEGC-IPCTBL)/2

                      $EJECT
                      ;
                      ; GPTBL - TABLE OF GROUP PAIRS
                      ;
                      $INCLUDE(:F1:M2GPT1)
03A5 00          =    M2GPTB: DB      M2G1P SHL 4 OR M2G1P
03A6 11          =            DB      M2G2P SHL 4 OR M2G2P
03A7 01          =            DB      M2G1P SHL 4 OR M2G2P
03A8 33          =            DB      M2G4P SHL 4 OR M2G4P
03A9 44          =            DB      M2G5P SHL 4 OR M2G5P
03AA 10          =            DB      M2G2P SHL 4 OR M2G1P
03AB 34          =            DB      M2G4P SHL 4 OR M2G5P
03AC 43          =            DB      M2G5P SHL 4 OR M2G4P
03AD 13          =            DB      M2G2P SHL 4 OR M2G4P
03AE 31          =            DB      M2G4P SHL 4 OR M2G2P
                      ;$INCLUDE(:F1:MMGPTB)
                      $INCLUDE(:F1:REGPTB)
03AF 79          =    REGPTB: DB      REG11P SHL 4 OR REG26P
03B0 79          =            DB      REG11P SHL 4 OR REG26P
03B1 8A          =            DB      REG21P SHL 4 OR REG36P
03B2 8A          =            DB      REG21P SHL 4 OR REG36P
03B3 7A          =            DB      REG11P SHL 4 OR REG36P
03B4 7A          =            DB      REG11P SHL 4 OR REG36P
03B5 7B          =            DB      REG11P SHL 4 OR REG46P
```

```
03B6 7B    =        DB      REG11P SHL 4 OR REG46P
03B7 8B    =        DB      REG21P SHL 4 OR REG46P
03B8 8B    =        DB      REG21P SHL 4 OR REG46P
             $INCLUDE(:F1:GEGPTB)
03B9 DC    = GEGPTB: DB     GEGBP SHL 4 OR GEGAP
03BA DD    =        DB      GEGBP SHL 4 OR GEGBP
03BB CD    =        DB      GEGAP SHL 4 OR GEGBP
03BC EE    =        DB      GEGCP SHL 4 OR GEGCP
03BD EC    =        DB      GEGCP SHL 4 OR GEGAP
03BE ED    =        DB      GEGCP SHL 4 OR GEGBP
03BF CE    =        DB      GEGAP SHL 4 OR GEGCP
03C0 DE    =        DB      GEGBP SHL 4 OR GEGCP
03C1 CC    =        DB      GEGAP SHL 4 OR GEGAP
03C2 CC    =        DB      GEGAP SHL 4 OR GEGAP

             $EJECT INCLUDE(:F1:TIMTBL)
           = ;
           = ; TIMTBL - TABLE OF INSTRUCTIONS-PER-TIME
           = ;
03C3 00    = MS0033: DB     00H,03DH,086H
03C4 3D    =
03C5 86    =
03C6 00    = MS0052: DB     00H,060H,0F2H
03C7 60    =
03C8 F2    =
03C9 01    = MS0150: DB     01H,017H,0A7H
03CA 17    =
03CB A7    =
03CC 05    = MS0690: DB     05H,006H,066H
03CD 06    =
03CE 66    =
03CF 05    = MS0700: DB     05H,019H,00BH
03D0 19    =
03D1 0B    =
03D2 07    = MS1000: DB     07H,048H,059H
03D3 48    =
03D4 59    =
03D5 0A    = MS1500: DB     0AH,0ECH,086H
03D6 EC    =
03D7 86    =
03D8 0E    = MS2000: DB     0EH,090H,0B1H
03D9 90    =
03DA B1    =
03DB 24    = MS5000: DB     24H,069H,0BBH
03DC 69    =
03DD BB    =
03DE 32    = MS7000: DB     32H,0FAH,06DH
03DF FA    =
03E0 6D    =

             $EJECT INCLUDE(:F1:KEYTBL)
           = ;
           = ; TABLES - PAGE 3 TABLES USED BY RINGER, KBDINP, TTANI AND TTOU
           = ;
           =
03E1 FF    = KEYTBL: DB     11111111B
03E2 EE    =        DB      11101110B
03E3 DE    =        DB      11011110B
03E4 BE    =        DB      10111110B
03E5 ED    =        DB      11101101B
03E6 DD    =        DB      11011101B
03E7 BD    =        DB      10111101B
03E8 EB    =        DB      11101011B
03E9 DB    =        DB      11011011B
03EA BB    =        DB      10111011B
03EB D7    =        DB      11010111B
03EC E7    =        DB      11100111B
03ED B7    =        DB      10110111B
03EE A7    =        DB      10100111B
03EF       = KEYTBX  EQU    $
           =

             $EJECT INCLUDE(:F1:P1EQUS)
```

```
                = 828 ;
                = 829 ; EQUS - SYSTEM RAM ASSIGNMENTS AND MASK EQUATES.
                = 830 ;
0020            = 831         ORG     20H
0020            = 832 KBDBUF  EQU     $
0020            = 833 KEY1:   DS      1
0021            = 834 KEY2:   DS      1
0022            = 835 KEY3:   DS      1
                = 836 ;
0080            = 837 XAUDTX  EQU     10000000B       ; TRANSMIT-MODE AUDIO OUTPUT.
0040            = 838 XAUDRX  EQU     01000000B       ; RECEIVE -MODE   "     "   .
0020            = 839 XPTT    EQU     00100000B       ; PUSH-TO-TALK RELAY ENABLE.
0010            = 840 XKPAWK  EQU     00010000B       ; KEEP-AWAKE ENABLE.
                = 841 ;
0080            = 842 XATTEN  EQU     10000000B       ; LOW-FREQUENCY ATTENUATION OU
0040            = 843 XGAPSL  EQU     01000000B       ; INTERTONE GAP SELECT INPUT.
0020            = 844 XDLYTX  EQU     00100000B       ; TRANSMIT DELAY SELECT INPUT.
                = 845 ;
000B            = 846 XSTAR   EQU     11              ; CODE FOR '*'.
000C            = 847 XPOUND  EQU     12              ; CODE FOR '#'.
000D            = 848 XCLEAR  EQU     13              ; CODE FOR '*#'.
                = 849 ;
00CB            = 850 KTMLIM  EQU     29*7            ; SEVEN-SECOND TIMEOUT.
                  851
                  852         END

USER SYMBOLS
BRTBL  001A   CLOAD  0265   CLOAD3 026B   CMP2TN 00FD   DELAY  0102   DELLPO 0103
DIVADO 0185   DIVAD1 018E   DIVAD2 0195   DIVAD3 01AE   DIVIDE 016B   DIVLPO 016D
GAPADO 0264   GAPCHK 025B   GEADO  00F5   GEDIAG 0093   GEGA   0358   GEGAP  000C
GEGB   036C   GEGBP  000D   GEGC   0380   GEGCP  000E   GEGPTB 03B9   GENADO 0208
GENAD1 0214   GENEL  00D3   GENLPO 01FB   GENLP1 01F0   GENTON 01E4   GENXIT 021C
GET2TN 0235   GETADO 0239   GETONE 024C   GRPTBL 0396   INTLZE 010B   IPCTBL 026E
KBDAD4 014F   KBDBUF 0020   KBDINP 0124   KBDLPO 013C   KBDLP1 012F   KBDS0A 0152
KBDS0B 015D   KBDS0C 0168   KBDSBO 0150   KEY1   0020   KEY2   0021   KEY3   0022
KEYTBL 03E1   KEYTBX 03EF   KTMLIM 00CB   M2G1   026E   M2G1P  0000   M2G2   0282
M2G2P  0001   M2G3   0296   M2G3P  0002   M2G4   02AA   M2G4P  0003   M2G5   02BE
M2G5P  0004   M2G6   02D2   M2G6P  0005   M2GPTB 0365   M2TAD2 0037   M2TAD3 003E
M2TONE 0023   M2TXIT 0040   M5G    02E6   M5GP   0006   M5TAD0 005A   M5TAD1 0068
M5TAD2 0074   M5TAD3 0085   M5TAD4 008D   M5TLPO 004C   M5TONE 0042   M5TPFF 0046
M5TX   0047   MMETRO 00F7   MS0033 03C3   MS0052 03C6   MS0150 03C9   MS0690 03CC
MS0700 03CF   MS1000 03D2   MS1500 03D5   MS2000 03D8   MS5000 03DB   MS7000 03DE
PAGE1  000D   RDPAD0 022A   RDPAD1 022E   RDPGCD 021D   RDPLP0 0221   REAAD0 00BA
REAAD1 00A9   REAAD2 00CF   REACH  0093   REG11  02FE   REG11P 0007   REG21  0312
REG21P 0008   REG26  031C   REG26P 0009   REG36  0330   REG36P 000A   REG46  0344
REG46P 000B   REGPTB 03AF   SLEEP  00F7   TMRAD0 000C   TMRINT 0007   TONE   01AF
TONLPO 01B3   XATTEN 0080   XAUDRX 0040   XAUDTX 0080   XCLEAR 000D   XDLYTX 0020
XGAPSL 0040   XKPAWK 0010   XMILPO 011D   XMITON 0114   XPOUND 000C   XPTT   0020
XSTAR  000B

ASSEMBLY COMPLETE,   NO ERRORS
```

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A paging encoder for the transmitter means of a telephone paging system of the type incorporating means for transmitting coded data to portable receiver/decoder units, comprising:
  a microcomputer programmed to contain a look-up table including tone and space data for plurality of paging formats and routines for converting input data to a tone and space code for a selected one of said paging formats;
  input means for providing input data to said microcomputer;
  selection means for altering the function of said microcomputer to cause it to provide output tone and space codes in a selected one of said paging formats; and
  output means for coupling tone and space codes produced by said microcomputer as encoded data to said transmitter means.

2. A paging encoder, as defined in claim 1, wherein said input means comprises a keyboard including a plurality of electrical switch means.

3. A paging encoder as defined in claim 1 wherein said output means comprises filter means for converting a rectangular output pulse to a pseudo sine wave.

4. A paging encoder as defined in claim 1, further comprising:
  a transmitter control output means for coupling a control voltage level from said microcomputer to the transmit control function of an associated transmitter.

5. A paging encoder as defined in claim 1, further comprising:
  power supply means for energizing said microcomputer;
  switching means for selectively coupling said power supply means to said microcomputer;
  said switching means responsive to activation of said input means for completing a power supply circuit between said power supply and said microcomputer; and means for interrupting said power supply circuit to said microcomputer after completion of the generation of a tone and space code by said microcomputer.

6. A paging encoder for the transmitter means of a telephone paging system of the type incorporating means for transmitting encoded data to portable receiver/decoder units, comprising:
  a microcomputer programmed to contain a look-up table including tone and space data for a plurality of paging formats and routines for converting input data to a tone, timing and space code for a selected one of said paging formats;
  said microcomputer normally in an off state and programmed to provide selected paging codes; means for inputting code selection data to said microcomputer; and
  means for energizing said microcomputer in response to activation of said means for inputting code selection data.

7. A paging encoder for the transmitter means of a telephone paging system of the type incorporating means for transmitting encoded data to portable receiver/decoder units, comprising
  a microcomputer programmed to contain a look-up table including tone and space data for a plurality of paging formats and routines for converting input data to a tone, timing and space code for a selected one of said paging formats;
  a keyboard;
  said microcomputer programmed to produce selected paging codes in response to inputs from said keyboard;
  a power source for said microcomputer; and control means for connecting said power source to said microcomputer for a predetermined period of time in response to activation of a key on said keyboard.

8. A paging encoder as defined in claim 7, further comprising:
  means for disconnecting said power source from said microcomputer a predetermined time after the activation of said keys on said keyboard.

9. A paging encoder as defined in claim 8, further comprising:
  means to provide a transmitter control signal commencing a predetermined time after activation of a key on said keyboard and for maintaining said transmitter control signal until said disconnection of said power source from said microcomputer.

10. A paging encoder as defined in claim 9, further comprising:
  output means for said microcomputer for converting said selected paging codes from a rectangular pulse format to a sinusoidal pulse format and for applying said sinusoidal pulse format to a transmitting means.

11. A paging encoder as defined in claim 9, further comprising:
  a light indicator means responsive to said transmitter control signal for indicating that an encoded signal is being transmitted.

12. A paging encoder as defined in claim 1
  wherein said microcomputer is a type 8048 microcomputer.

13. A paging encoder as defined in claim 10 wherein said microcomputer is a type 8048 microcomputer.

* * * * *